(12) United States Patent
Honda et al.

(10) Patent No.: US 7,866,001 B2
(45) Date of Patent: Jan. 11, 2011

(54) DOOR OPENING/CLOSING DEVICE FOR VEHICLE

(75) Inventors: Manabu Honda, Toyota (JP); Ryousuke Ariyoshi, Toyota (JP)

(73) Assignee: Toyota Shatai Kabushiki Kaisha, Kariya-Shi (JP)

( * ) Notice: Subject to any disclaimer, the term of this patent is extended or adjusted under 35 U.S.C. 154(b) by 398 days.

(21) Appl. No.: 11/990,021

(22) PCT Filed: Aug. 8, 2006

(86) PCT No.: PCT/JP2006/315637

§ 371 (c)(1),
(2), (4) Date: Feb. 5, 2008

(87) PCT Pub. No.: WO2007/029441

PCT Pub. Date: Mar. 15, 2007

(65) Prior Publication Data

US 2009/0139057 A1    Jun. 4, 2009

(30) Foreign Application Priority Data

Sep. 1, 2005    (JP) .............................. 2005-253042

(51) Int. Cl.
*E05D 11/08* (2006.01)
(52) U.S. Cl. ................. 16/342; 16/54; 16/307
(58) Field of Classification Search .................. 16/342, 16/319, 50, 54, 306–309, 337; 188/290–296, 188/322.5, 3.6, 3.7; 296/146.11, 146.1; 180/69, 180/21

See application file for complete search history.

(56) References Cited

U.S. PATENT DOCUMENTS

| | | | | |
|---|---|---|---|---|
| 1,970,369 A | * | 8/1934 | Focht | 188/306 |
| 5,109,571 A | * | 5/1992 | Ohshima et al. | 16/307 |
| 5,152,189 A | * | 10/1992 | Miura et al. | 464/180 |
| 5,664,286 A | * | 9/1997 | Sorimachi | 16/54 |
| 5,996,132 A | * | 12/1999 | Sorimachi | 4/236 |
| 6,725,503 B1 | * | 4/2004 | Lin | 16/76 |
| 7,343,646 B2 | * | 3/2008 | Hayashi | 16/412 |
| 2002/0179387 A1 | * | 12/2002 | Orita | 188/290 |
| 2003/0150678 A1 | * | 8/2003 | Iwashita | 188/296 |

FOREIGN PATENT DOCUMENTS

DE    20 2006 006067 U1    7/2006

(Continued)

*Primary Examiner*—Chuck Y. Mah
(74) *Attorney, Agent, or Firm*—Oliff & Berridge PLC (57) ABSTRACT

To provide a vehicle door opening/closing device arranged to pivotally connect a vehicle body and a door with a hinge member and provided with a damper arranged to impart a braking force to the door when the door is turned, the damper being directly connected to the hinge member, the hinge member includes a first hinge arm fixed to a floor, a pin shaft fixed to the first hinge arm and extending outward of the first hinge arm, and a second hinge arm pivotally mounted on the pin shaft and fixed to a lower end of a lower door, and the damper includes a rotors connected to a projecting portion of the pin shaft, a housing rotatably mounted on the rotor and fixed to the lower door, and a braking means contained in the housing to impart a braking force to the housing when the housing is rotated relative to the rotor.

5 Claims, 12 Drawing Sheets

FOREIGN PATENT DOCUMENTS

| | | |
|---|---|---|
| JP | U 7-10341 | 2/1995 |
| JP | A 8-303514 | 11/1996 |
| JP | A 2003-120121 | 4/2003 |
| JP | A 2004-52373 | 2/2004 |
| JP | A 2004-75018 | 3/2004 |
| JP | A 2005-35365 | 2/2005 |

\* cited by examiner

DOOR OPENING/CLOSING DEVICE FOR VEHICLE

TECHNICAL FIELD

The present invention relates to a door opening/closing device for vehicle and, particularly, to a door opening/closing device provided with a damper for imparting a braking force to a door when the door is turned with respect to a vehicle body.

BACKGROUND ART

Figure 10:
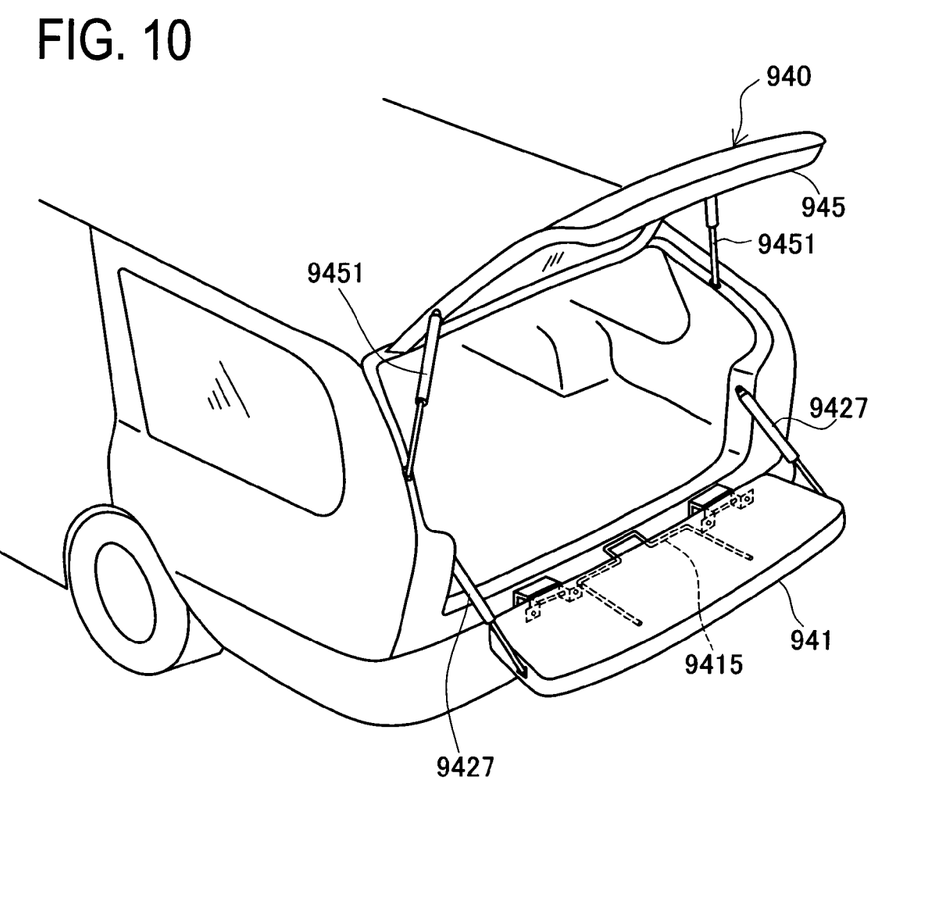
FIG. 10 is a view showing an example of a conventional vehicle door opening/closing device using a torsion bar and a gas damper.

As shown in FIG. 10, a back door 940 for opening/closing an opening of a vehicle body includes an upper door 945 for opening/closing the upper part of the opening and a lower door 951 for opening/closing the lower part of the opening. The upper door 945 is pivotally connected, at its upper end, to a rear end of a vehicle roof by an upper hinge so as to be turned upward and downward. The upper door 945 is flipped up to open the opening.

The lower door 951 is pivotally connected, at its lower end, to a rear end of a vehicle floor by a lower hinge so as to be turned upward and downward. The lower door 951 is turned to a horizontal position to open the opening.

Between the lower door 941 and the vehicle, there are provided a torsion spring 9415 that urges the lower door 941 in a closing direction to reduce a control force needed for closing the lower door 941 and dampers 9427 for imparting a braking force to the lower door 941 to prevent the lower door 941 from being burst open by its own weight.

Each damper 9427 is in the shape of a telescopic rod including a cylinder and a piston rod, the ends of which are connected to a side edge of the opening and a side end of the lower door 941 respectively.

One configuration using the above rod-like damper between the lower door 941 and the vehicle body is disclosed in JP 2004-75018A (hereinafter, "Patent Document 1").
[Patent Document 1] JP 2004-75018A

DISCLOSURE OF INVENTION

Problems to be Solved by the Invention

However, the above conventional configuration would cause the following problem. When the lower door 941 is opened, each damper 9427 is stretched between the side end of the lower door 941 and the side edge of the opening, resulting in interference with the work of taking in and out baggage and deterioration of the appearance.

The present invention has been made to solve the above problems and has a purpose to provide a door opening/closing device for vehicle, including a damper that does not interfere with the work of taking in and out baggage and can provide a good appearance.

Means for Solving the Problems

A vehicle door opening/closing device set forth in claim 1 according to the invention is characterized in a vehicle door opening/closing device including a hinge member for pivotally connecting a door for opening and closing an opening of a vehicle body to the vehicle body, and a damper for imparting a braking force to the door when the door is turned relative to the vehicle body, wherein the hinge member includes: a first hinge arm to be attached to one of an edge of the opening and an end of the door facing to each other; a pin shaft fixed to the first hinge arm to be placed along the edge of the opening and the end of the door; and a second hinge arm pivotally mounted on the pin shaft and to be attached to the other one of the edge of the opening and the end of the door, and the damper includes: a rotor connected to the pin shaft; a housing rotatably mounted on the rotor and to be attached to the other one of the vehicle body and the door, or, the second hinge arm; a braking means contained in the housing and arranged to impart a braking force to the housing when the housing is rotated relative to the rotor.

Accordingly, the damper is placed on the axis line of the pin shaft of the hinge member between the edge portion of the opening and the end portion of the door. Thus, the damper will not interfere with the work of taking in and out baggage and can provide a good appearance.

The door opening/closing device for vehicle set forth in claim 2 of the invention is characterized in that, in the door opening/closing device for vehicle of claim 1, one end of the pin shaft forms a projecting portion that extends outward of both hinge arms and is connected to the rotor.

Accordingly, a simple structure for connecting the damper to the hinge member can be achieved.

Further, the door opening/closing device for vehicle set forth in claim 3 of the invention is characterized in that, in the door opening/closing device for vehicle of claim 1 or 2, the hinge member is arranged to connect a lower end of the door to the vehicle body in such a way that the door can be turned upward and downward, and the damper is arranged to increase the braking force as the door is turned in an opening direction.

Accordingly, the braking force is small in the vicinity of the closed position and therefore the door can be opened smoothly. Since the braking force is increased toward the open position, the door can be prevented from being burst open and rattling by its own weight.

According to the door opening/closing device for vehicle of the present invention, the damper will not interfere with the work of taking in and out baggage and can provide a good appearance.

EXPLANATION OF REFERENCE CODES

1 Vehicle door opening/closing device
10 Hinge member
11 First hinge arm
13 Second hinge arm
15 Pin shaft
159 Projection
20 Damper
21 Rotor
2131 Rectangular connection hole
23 Housing
2313 Eccentric groove
237 Stay
25 Cap
27a, b Oil chamber
29 Braking means (Viscous fluid)
40 Back door
41 Lower door
45 Upper door
60 Floor part
t Clearance

BEST MODE FOR CARRYING OUT THE INVENTION

A detailed description of a preferred embodiment of a door opening/closing device for vehicle embodying the present invention will now be given referring to the accompanying drawings.

Figure 1:
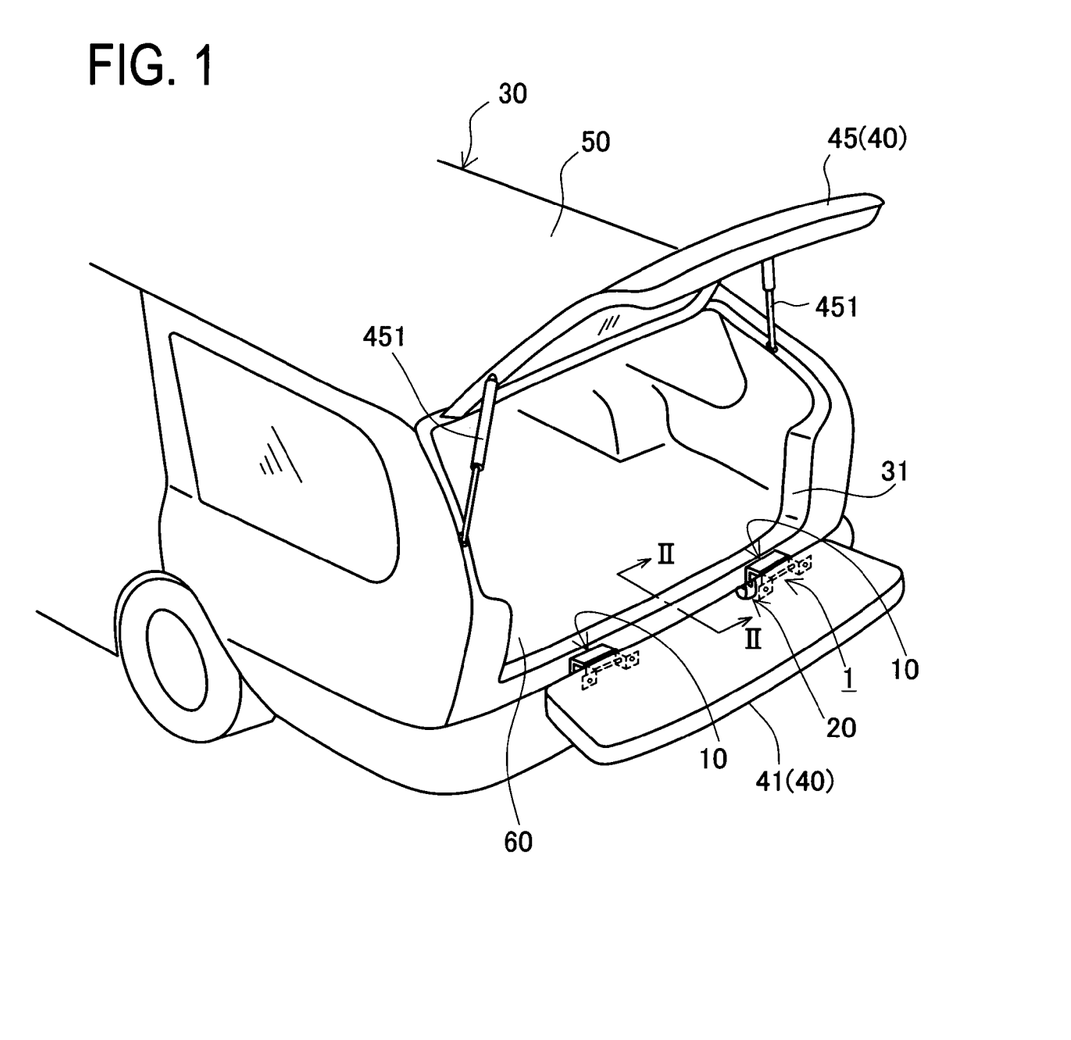
FIG. 1 is a perspective rear view of a vehicle provided with a vehicle door opening/closing device of a preferred embodiment of the invention, showing an open state of a back door.
Figure 2:
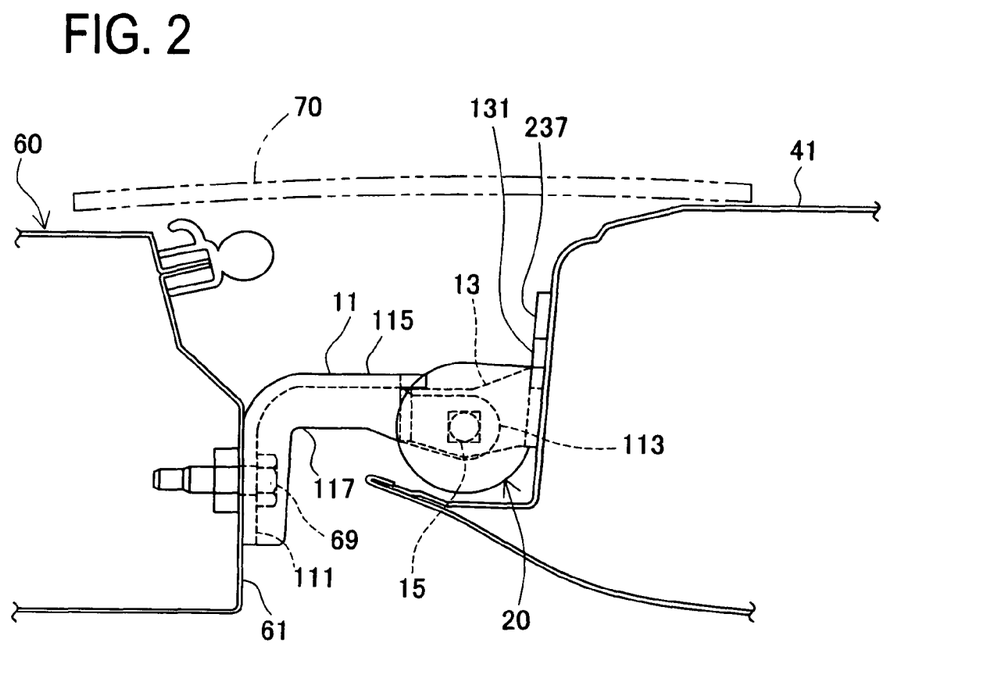
FIG. 2 is a sectional view taken along a line II-II in FIG. 1.
Figure 3:
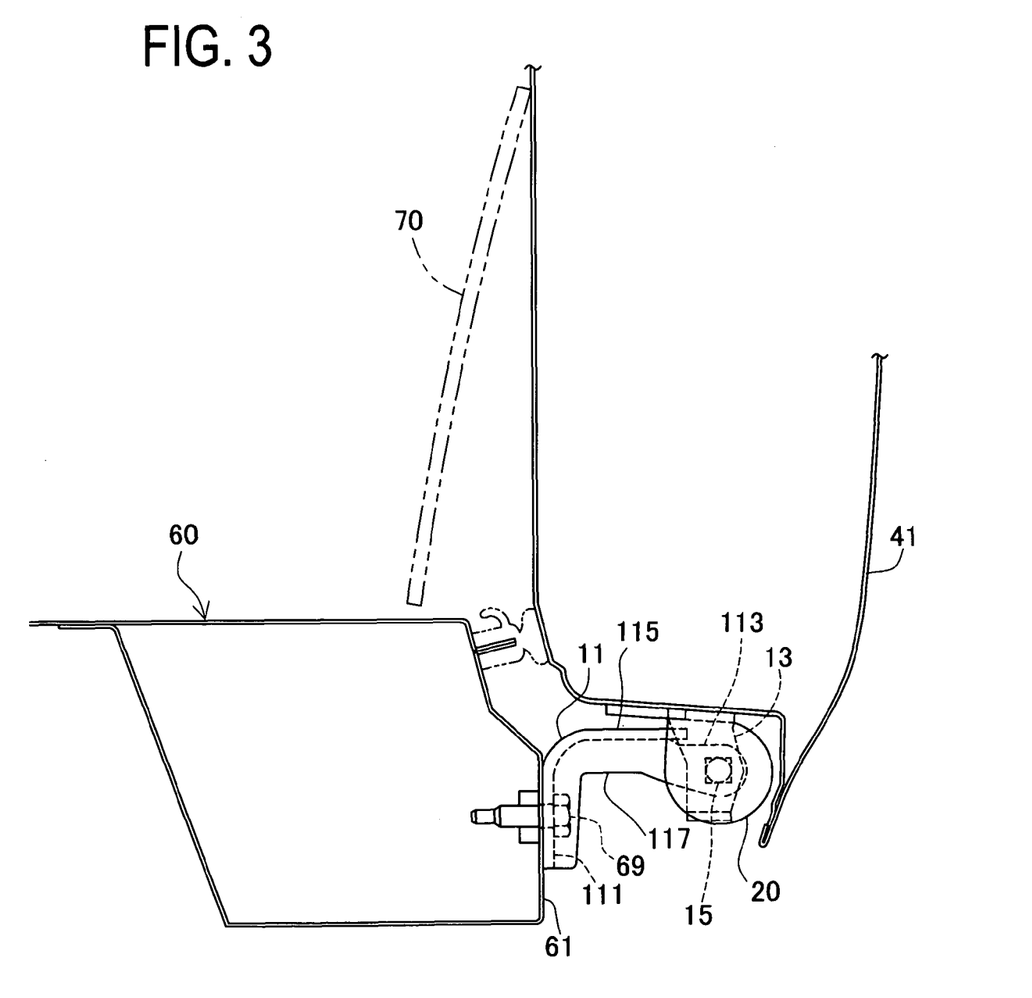
FIG. 3 is a sectional view of the same with a lower door closed.

FIG. 1 is a perspective rear view of a vehicle, showing an open state of a back door; FIG. 2 is a sectional view taken along a line II-II in FIG. 1; and FIG. 3 is a sectional view of the same with a lower door closed.

As shown in FIG. 1, a rear opening 31 of a vehicle body 30 can be opened and closed by a back door 40. The back door 40 includes an upper door 45 for opening and closing the upper part of the rear opening 31 and a lower door 41 for opening and closing the lower part of the rear opening 31. The upper door 45 and the lower door 41 are pivotally connected to the vehicle body 30 respectively so as to be opened and closed by a predetermined operation with opening/closing devices. In the present embodiment, a vehicle door opening/closing device 1 according to the present invention is applied to an opening/closing device for the lower door 41.

An opening/closing device for the upper door 45 is comprised of a hinge member (not shown) for pivotally supporting the upper door 45 so that the upper door 45 can be turn upward and downward relative to the vehicle body 30 and dampers 451 arranged to impart an urging force to the upper door 45 in an opening direction and holding the upper door 45 in the open position.

The hinge member connects a roof part 50 defining the upper edge of the rear opening 31 to the upper edge of the upper door 45.

Each damper 451 is a gas-filled damper provided with a cylinder and a piston rod arranged to be movable in and out of the cylinder (a so-called gas damper). Each damper 451 is connected to one of right and left side ends of the upper door 45 and one of side edges of the rear opening 31.

The opening/closing device 1 for the lower door 41 is comprised of a hinge member 10 for pivotally supporting the lower door 41 so that the lower door 41 can be turned upward and downward relative to the vehicle body 30 and a damper 20 arranged to impart a braking force to the lower door 41 when the lower door 41 is opened in order to prevent the lower door 41 from being burst open by its own weight.

The right and left side ends of the lower door 41 are connected to the side edges of the rear opening 31 by wires (not shown). The wires can be tensioned when the lower door 41 is opened to a substantially horizontal open position, thereby holding the lower door 41 in that position.

The hinge member 10 includes a first hinge arm 11 fixed to a floor part 60 defining the lower edge of the rear opening 31, a pin shaft 15 held against rotation by the first hinge arm 11, and a second hinge arm 13 rotatably mounted on the pin shaft 15 and secured to the lower end of the lower door 41, as shown in FIGS. 2 to 4 and FIG. 6.

The first hinge arm 11 includes a mounting seat 111 secured to a substantially vertical wall 61 of the floor part 60 with a bolt 69, a horizontal part 115 bent from the upper end of the mounting seat 111 so as to substantially horizontally extend in a direction opposite the vertical wall 61 of the floor part 60, and flanges 117 bent from right and left end portion s of the mounting seat 111 and the horizontal part 115 to face each other, forming a U-shape in section.

Each flange 117 of the horizontal part 115 further extends in the direction opposite the vertical wall 61 and formed at a predetermined position with a hole 1131 (see FIG. 6) through which the pin shaft 15 is inserted, thus forming a semicircular shaft-fixing part 113 centered on the hole 1131.

Of the holes 1131 of the right and left shaft fixing parts 113, the hole 1131 on the left side in a vehicle traveling direction has a rectangular shape and the other hole 1131 on the right side has a round shape.

Figure 6:
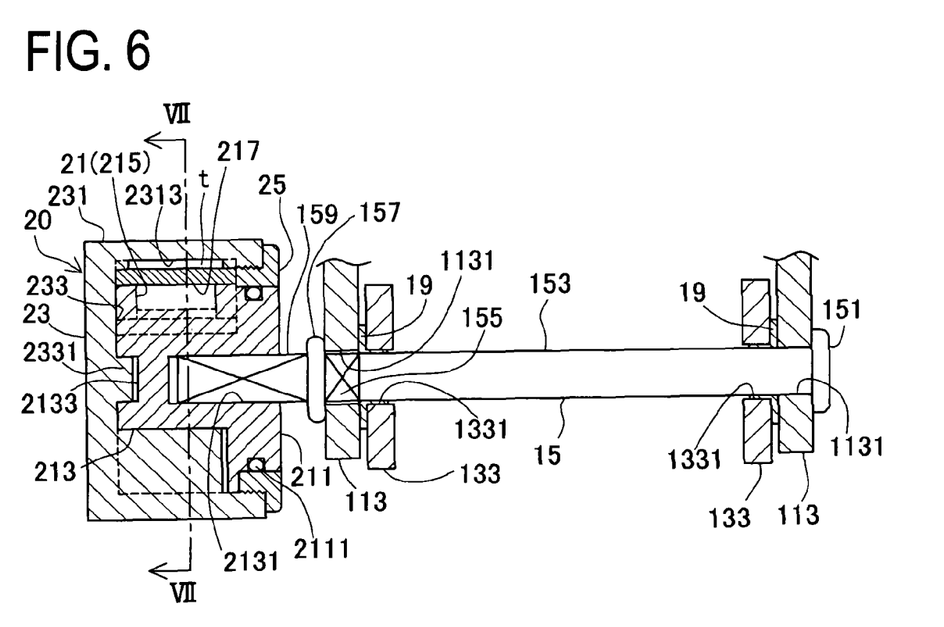
FIG. 6 is a sectional view taken along a line VI-VI in FIG. 4.

As shown in a sectional view of FIG. 6, the pin shaft 15 coaxially includes, as viewed in the order of insertion into the hole 1131, a head 151, a pin portion 153, a rectangular-section portion 155, a flange 157, and a projecting portion 159. They are arranged along the lower edge of the rear opening 31 and the lower end of the lower door 41.

The head 151 is riveted or swaged in an assembly process of the hinge member 10. The pin portion 153 is a shaft having a circular section which rotatably supports the second hinge arm 13 mentioned later via bearings 19.

The rectangular-section portion 155 is formed to have a square section which is coaxial with the pin portion 153 and has four sides each being slightly larger than the diameter of the pin portion 153. The rectangular-section portion 155 is engaged in the rectangular hole 1131 formed in one of the shaft fixing parts 113 to inhibit rotation of the pin shaft 15 relative to the first hinge arm 11.

The flange 157 is larger in diameter than the rectangular-section portion 155 and serves to fix the pin shaft 15 to the first hinge arm 11 in cooperation with the head 151.

The projecting portion 159 is formed extending by a predetermined length from the flange 157 in a direction opposite the pin portion 153 and having a rectangular section. Specifically, this projecting portion 159 extends outward of the hinge arms 11 and 13 in such a manner as to engage with the damper 20 mentioned later.

Figure 4:
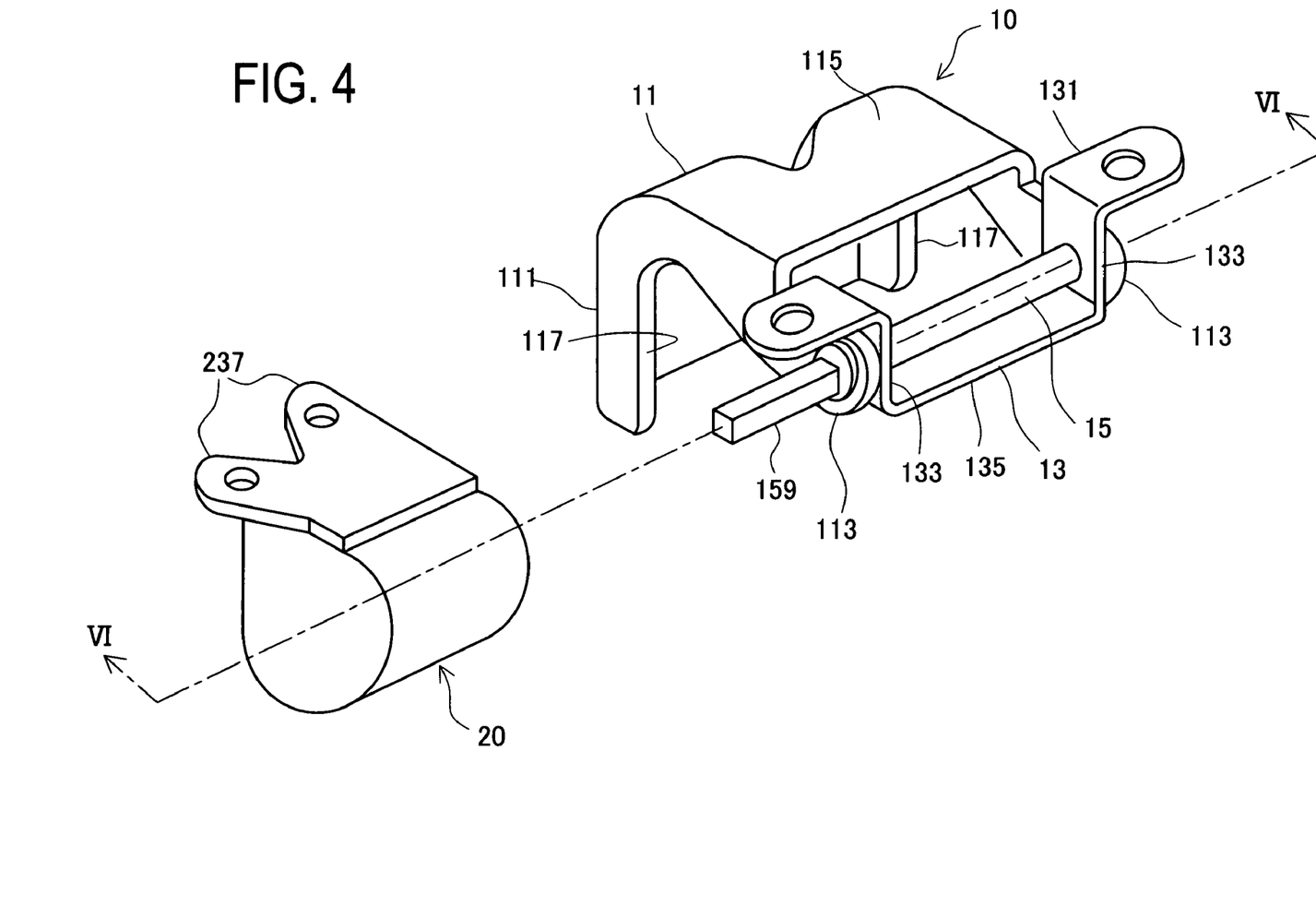
FIG. 4 is an exploded perspective view of the vehicle door opening/closing device of the embodiment of the invention.

The second hinge arm 13 has a nearly hat-shaped section as shown in FIG. 4 showing a perspective view of the hinge member 10 corresponding to a closed state of the lower door 41. The second hinge arm 13 includes right and left lugs 131 each of which is centrally formed with a hole in which a bolt is tightened for attachment to the lower surface of the lower door 41, bearing portion s 133 spaced at a distance slightly shorter than the distance between the shaft fixing portion s 113 of the first hinge arm 11, and a connecting portion 135 connecting the bearing portion s 133.

Each bearing portion 133 is formed, at a predetermined position, with a circular through hole 1331 (see FIG. 6) through which the pin shaft 15 is inserted interposing the bearing 19.

Figure 5:
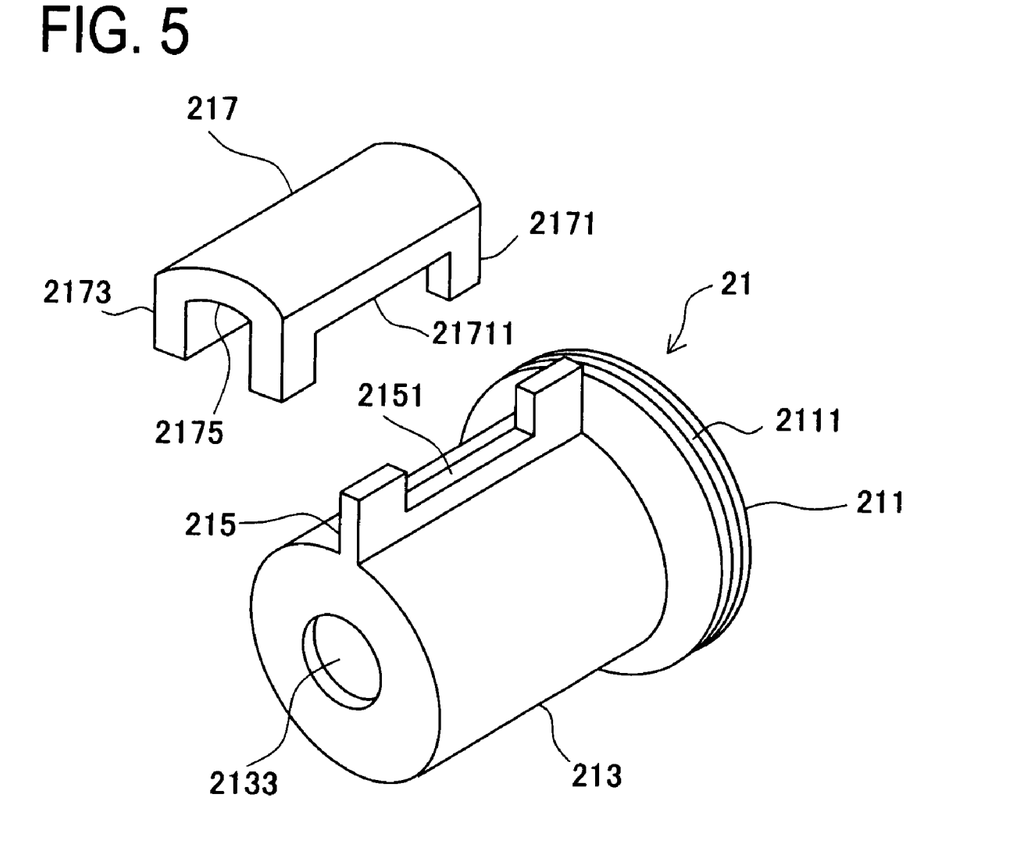
FIG. 5 is an exploded perspective view of a rotor and a valve element of the vehicle door opening/closing device of the embodiment.

Next, as shown in FIGS. 4 to 6, the damper 20 includes a rotor 21 connected to the projecting portion 159 of the pin shaft 15, a housing 23 rotatably mounted on the rotor 21 and fixed to the lower door 41, a cap 25 which hermetically closes the housing 21 containing the rotor 21, and a braking means 29 contained in the housing 23 and arranged to impart a braking force to the housing 23 when the housing 23 is rotated relative to the rotor 21.

The braking means 29 includes an after-mentioned vane 215 formed on the rotor 21, a valve element 217 placed covering the vane 215, and a viscous fluid 299 filled in the housing 23.

The rotor 21 includes a disc part 211 centrally formed with a connecting rectangular bottomed hole 2131 in which the projecting portion 159 of the pin shaft 15 is engaged, a cylindrical shaft 213 protruding from the disc part 211 to surround the bottom of the rectangular hole 2131, and the vane 215 protruding outward from part of the shaft 213.

On the periphery of the disc part 211, a seal groove 2111 is formed and receives a seal member in slidable contact with the inner periphery of the cap 25.

The rectangular hole 2131 opens at the outer surface of the disc part 211 and has a depth short of reaching an after-mentioned recess 2133 formed in the shaft 213. The circular recess 2133 is formed in the shaft 213 in such a manner as to be opposite the rectangular hole 2131 with respect to the bottom thereof and coaxial with the rectangular hole 2131.

The vane 215 is formed in plate shape protruding outward from part of the shaft 213 as shown in FIG. 5 so as to have a height perpendicular to the axis, the height being determined by subtracting the thickness of an after-mentioned bottom portion 2175 of the valve element 217 and the radius of the shaft 213 from the radius of an inner wall surface 2311 of the housing 23. The vane 215 is formed with a cutout 2151 in the center of the axial direction.

The valve element 217 covering the vane 215 includes the bottom portion 2175, and right and left flanges 2171 and 2173 extending downward from the right and left ends of the bottom portion 2175 to provide a U-shape in section. The outer surface of the bottom portion 2175 is curved to nearly conform to the inner periphery of the housing 23. The right flange 2171 shown in FIG. 5 is formed with a cutout 21711 in the center of the axial direction.

The valve element 217 is mounted on the vane 215 so that the valve element 217 is slightly movable with a clearance relative to the vane 215 between the right and left flanges 2171 and 2173.

On the other hand, the housing 23 has a bottomed shape including a cylindrical wall 231, a bottom wall 233 forming the bottom of the cylindrical wall 231, and a fixed vane 235 radially inwardly protruding from the cylindrical wall 231, one end of the fixed vane 235 being continuous to the bottom wall 233 and the other end facing to the opening of the housing 23, and the vane 235 having a height so as to contact with the periphery of the shaft 213 of the rotor 21.

Figure 7:
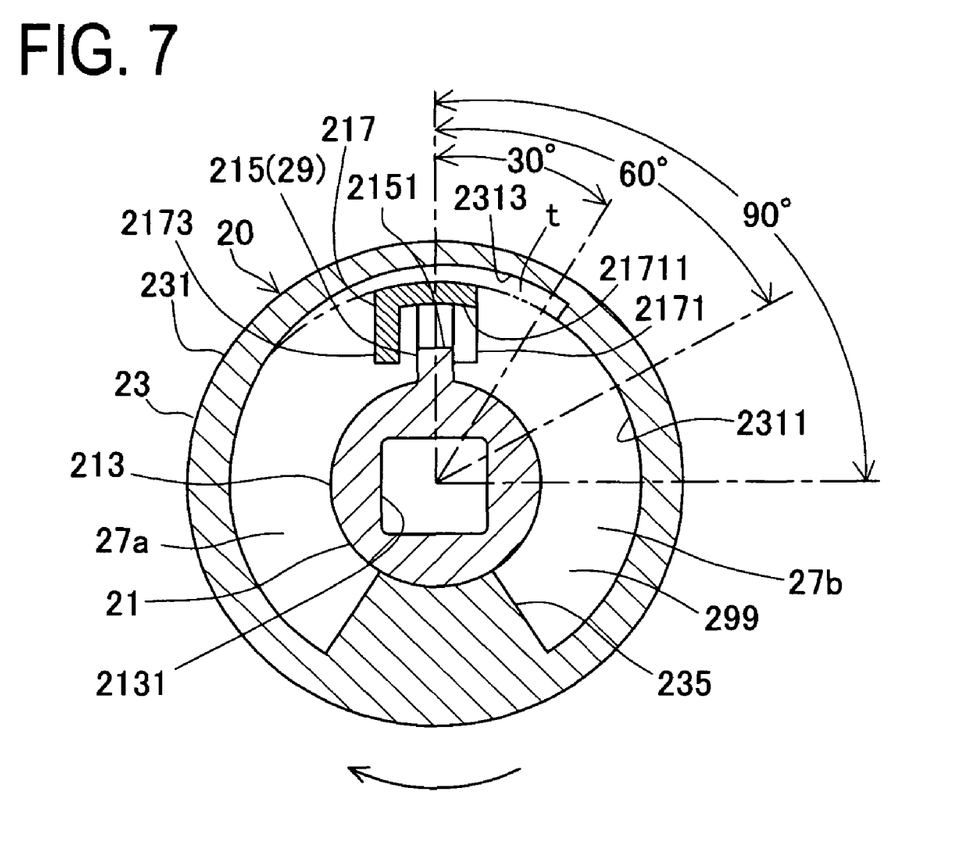
FIG. 7 is a sectional view taken along a line VII-VII in FIG. 6.
Figure 8A:
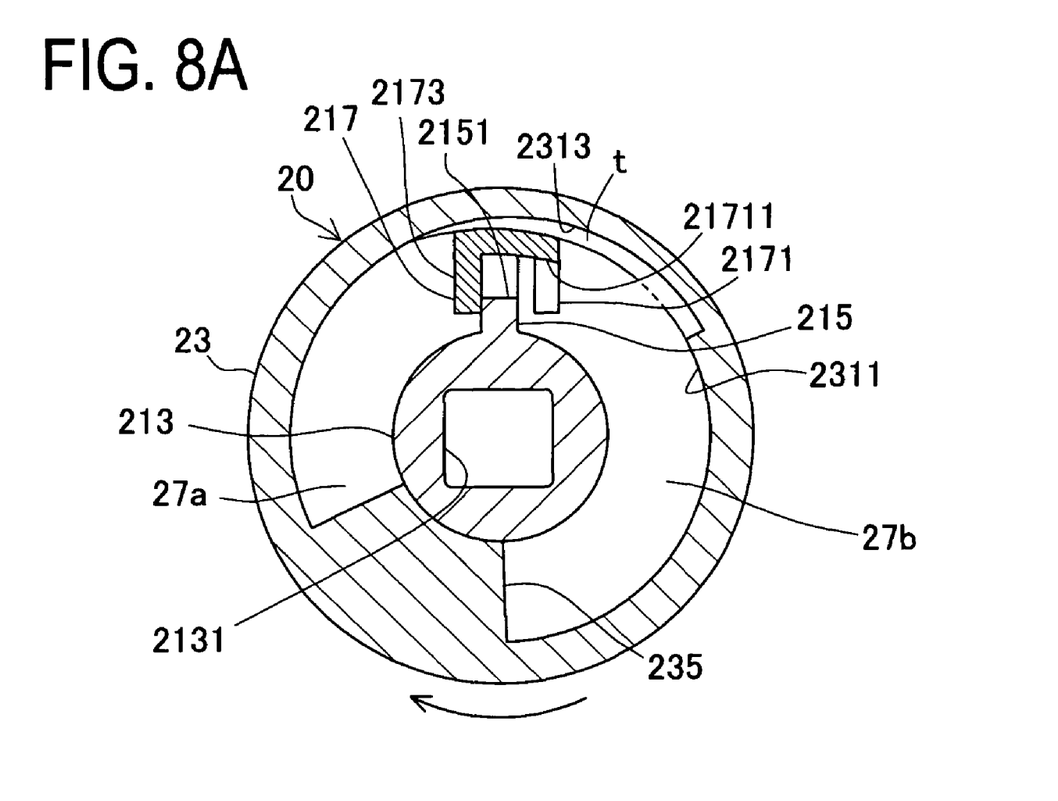
FIG. 8A is a sectional view of the vehicle door opening/closing device of the embodiment of the invention, showing a rotating state of a housing relative to the rotor when the door opens at an angle of 30°.
Figure 8B:
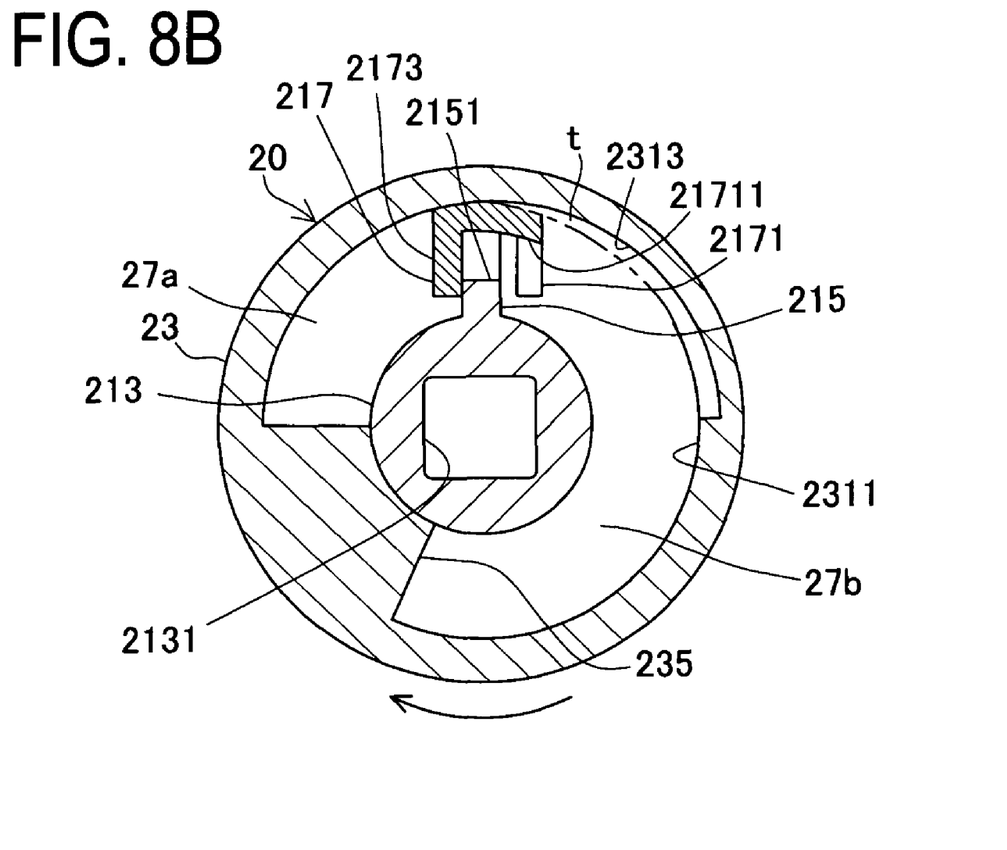
FIG. 8B is another sectional view of the vehicle door opening/closing device of the embodiment of the invention, showing a rotating state of the housing relative to the rotor when the door opens at an angle of 60°.
Figure 8C:
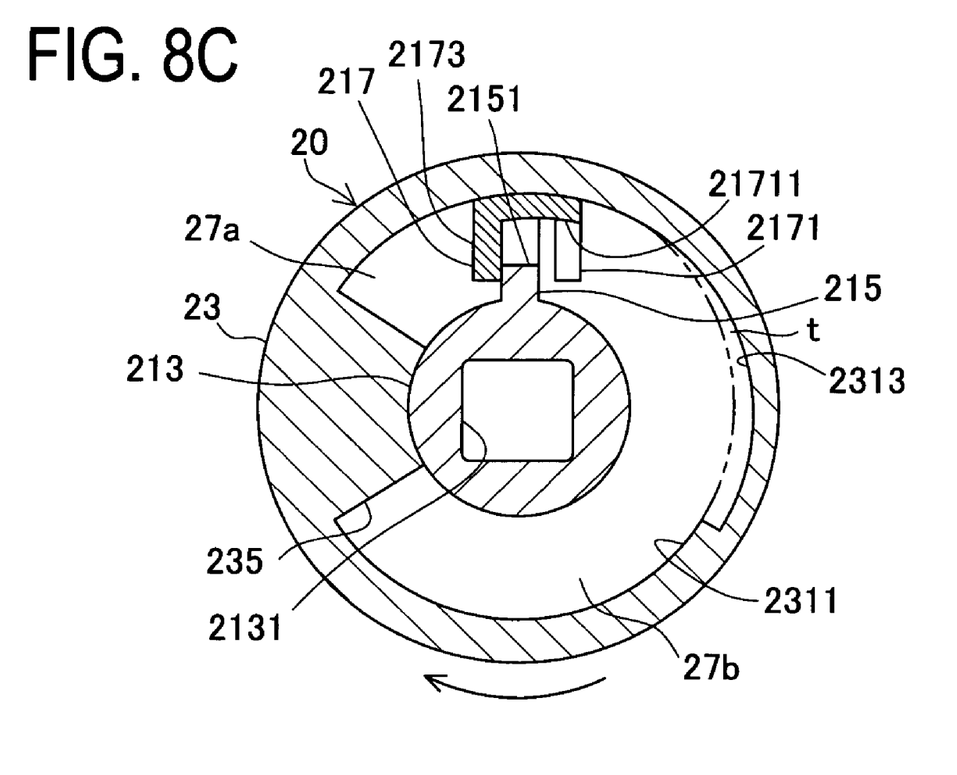
FIG. 8C is another sectional view of the vehicle door opening/closing device of the embodiment of the invention, showing a rotating state of the housing relative to the rotor when the door fully opens at an angle of 90°.
Figure 9:
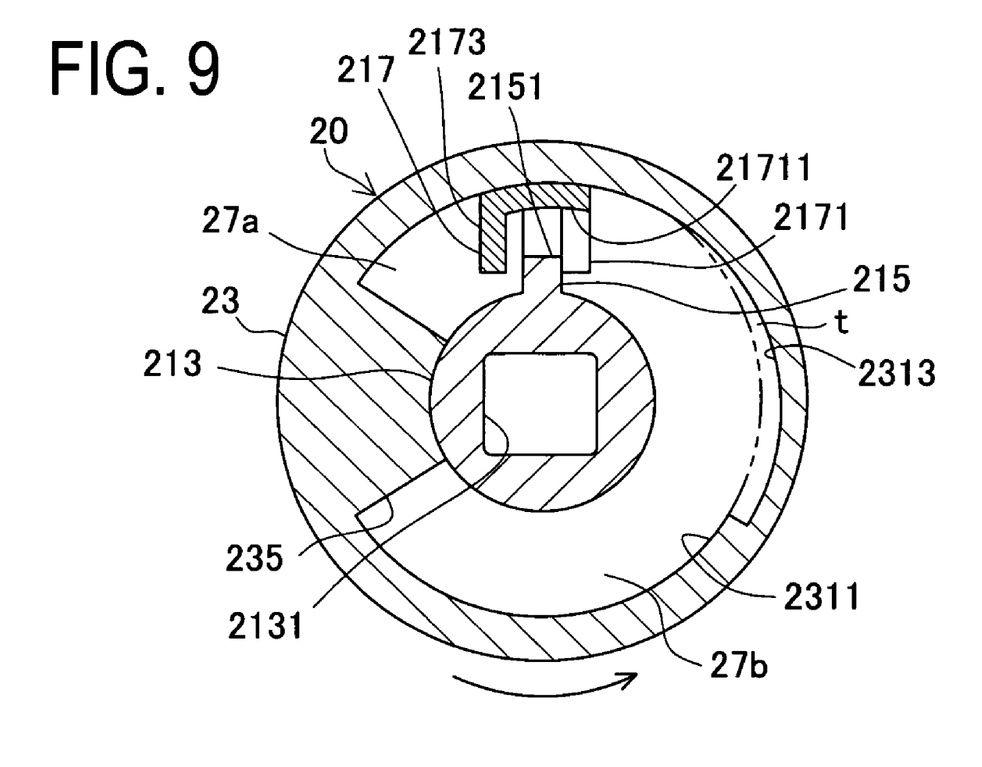
FIG. 9 is a sectional view of the vehicle door opening/closing device of the embodiment of the invention, showing a state where the door begins to close from a door full open position.

The inner wall surface 2311 of the cylindrical wall 231 is formed with an eccentric groove 231 having a depth gradually increasing outward from the inner wall surface 2311, the groove 231 being in nearly a diametrically opposite position, as shown in sectional views of FIGS. 7 to 9.

This eccentric groove 2313 is designed under the following conditions. While the lower door 41 is turned from the almost vertical, full closed position to a full open position at 90° thereto, the sectional area of a clearance "t" between the eccentric groove 2313 and the outer surface of the valve element 217 is maximum as shown in FIG. 7 when the lower door 41 is in a full closed position, the sectional area of the clearance "t" is decreased as the lower door 41 is gradually turned in the opening direction as shown in FIGS. 8A to 8C, and the valve element 217 comes to face a portion not provided with the eccentric groove 2313 when the lower door 41 in the full open position (FIG. 8C).

The inner diameter of the inner wall surface 2311 of the cylindrical wall 231 is determined to be almost equal to the outer diameter provided by the outer surface of the valve element 217 when the valve element 217 is mounted to cover the vane 215 of the rotor 21. The inner wall surface 2311 is formed, around an opening, with a screw threaded portion which engages with the cap 25 mentioned later.

The bottom wall 23 is centrally formed with a protrusion 2331 protruding toward the opening at a predetermined height so as to enter in the recess 2133 of the rotor 21.

The cap 25 is formed in an annular shape having an L-shape in section. In its aperture, the disc part 211 of the rotor 21 is hermetically fitted with the seal member inserted in the seal groove 2111. The outer surface around the aperture is formed with a male screw threaded portion which engages with the screw threaded portion of the opening area of the inner wall surface 2311 of the housing 23 and a flange portion held in contact with the end face around the opening of the housing 23.

The damper 20 configured as above is assembled in such a manner as that the rotor 21 with the vane 215 being covered by the valve element 217 is inserted from the shaft 213 side into the housing 23 filled with the viscous fluid 299, the cap 25 is fitted around the disc part 211, causing the viscous fluid 299 to overflow, and then the cap 25 is engaged and tightened in the screw threaded portion formed around the opening of the cylindrical wall 231 of the housing 23.

On the outer periphery of the cylindrical wall 231 of the housing 23, stays 237 for attachment of the housing 23 to the lower end of the door 41 are formed protruding in Y-shape in parallel to the central axis. In the present embodiment, the damper 20 is attached to be flush with the lower end of the lower door 41 to which the second hinge arm 13 of the hinge member 10 is attached. Accordingly, the distance from the center of the shaft 213 of the rotor 21 to the outer surfaces of the stays 237 is determined to be equal to the distance from the center of the pin shaft 15 of the second hinge arm 13 to the mounting surfaces of the lugs 131.

The above configured hinge members 10 are mounted side by side at a predetermined spaced interval in such a manner as that each hinge arm 11 is attached to the floor part 60 and each second hinge arm 13 is attached to the lower end of the lower door 41. On the other hand, the damper 20 is mounted on the lower end of the lower door 41 by use of the stays 237 of the damper 20, adjacently to the hinge member 10, when the projecting portion 159 extending from the pin shaft 15 of the hinge member 10, which is placed on the right side in the vehicle traveling direction, toward the center of the vehicle is inserted in the rectangular hole 2131 provided in the center of the rotor 21 of the damper 20. Thus, those hinge member 10 and damper 20 constitute the vehicle door opening/closing device 1.

It is to be noted that the lower door 41 is provided, as with a conventional structure, with a torsion spring (the same as that in FIG. 10) serving as a support means for assisting the power to lift the lower door 41 in order to close the lower door 41 from the full open position, a board 70 disposed to automatically close a gap between the floor part 60 and the lower door 41 when the lower door 41 is fully closed, and others.

Operation of the vehicle door opening/closing device will be explained below. In particular, the explanation will be made with a focus on the operation of the damper 20 following the door opening and closing.

The rotor 21 of the damper 20 is connected to the projecting portion 159 of the pin shaft 15 that is fixed to the first hinge arm 11 attached to the floor part 60 of the vehicle. Accordingly, irrespective of the opening/closing operation of the lower door 41, the vane 215 is fixed in an upright position as shown in FIG. 7.

In this state, when the lower door 41 is returned from the open position shown in FIG. 2 to the vertical, closed position shown in FIG. 3, the valve element 217 is pushed leftward in the figure by the viscous fluid 299 filled in the oil chamber 27b and the right flange 2171 of the valve element 217 comes into contact with the right surface of the vane 215 in FIG. 7.

Then, the cutout 21711 of the right flange 2171 and the cutout 2151 of the vane 215 are continuous with each other, forming a clearance between the left flange 2173 and the left surface of the vane 215 to form a flow passage of the viscous fluid 299.

Further, the housing 23 is in a position where the clearance "t" is large between the eccentric groove 2313 and the valve element 217. Thus, the oil chambers 27a and 27b partitioned by the rotor 21 and the valve element 217 are communicated to each other through the passage defined by the cutouts 21711 and 2151. The viscous fluid 299 is therefore allowed to easily move.

When the lower door 41 is opened in an arrow direction by 30° from the vertical, closed position, the housing 23 is rotated clockwise 30° relative to the rotor 21 as shown in FIG. 8A. The viscous fluid 299 in the oil chamber 27a pushes the left flange 2173 of the valve element 217 rightward. Then, the left flange 2173 comes into contact with the left surface of the vane 215 in the figure to close the cutout 2151 of the vane 215. The viscous fluid 299 is therefore not allowed to pass through this cutout 2151.

However, the housing 23 is in a position where the clearance "t" between the eccentric groove 2313 and the valve element 217 is smaller. Accordingly, the viscous fluid 299 existing in the oil chamber 27b is allowed to flow in the oil chamber 27a through only the clearance "t". Thus, resistance in opening the lower door 41 is still small.

When the lower door 41 is further opened in the arrow direction by 60° from the vertical, closed position, the cutout 2151 of the vane 215 remains closed as shown in FIG. 8B and hence the viscous fluid 299 is not allowed to pass through the cutout 2151. Further, the clearance "t" is further smaller, the movement of the viscous fluid 299 from the oil chamber 27b to the oil chamber 27a is gradually restricted. Accordingly, the resistance in opening the lower door 41 is gradually increased.

When the lower door 41 is opened in the arrow direction from the 60° position to a 90° position, the cutout 2151 of the vane 215 remains closed as shown in FIG. 8C and hence the viscous fluid 299 is not allowed to pass through the cutout 2151. The clearance "t" is nearly zero but allows the viscous fluid 299 to barely move through such a little clearance between the inner wall surface 2311 of the housing 23 and the outer surface of the valve element 217. The resistance in opening the lower door 41 is therefore increased.

This can brake the opening action (falling-down) of the lower door 41 by its own weight. The opening movement of the lower door 41 in the vicinity of the open position can be made slow. Accordingly, the lower door 41 can be opened softly.

When the lower door 41 is rotated counterclockwise, like an arrow, from the 90° open position toward the closed position, the right flange 2171 of the valve element 217 is pushed by the viscous fluid 299 existing in the oil chamber 27b and then comes into contact with the right surface of the vane 215 in the figure, as shown in FIG. 9. Thus, a flow passage is formed between the left flange 2173 and the left surface of the vane 215 in the figure, allowing communication between the oil chambers 27a and 27b.

The viscous fluid 299 existing in the oil chamber 27b is thus allowed to pass through this flow passage to flow in the oil chamber 27a. Accordingly, the resistance in turning the lower door 41 in the closing direction is reduced. The lower door 41 can be closed easily.

When the lower door 41 is further turned in the closing direction, the flow passage defined by both the cutouts 21711 and 2151 remains and the clearance "t" between the eccentric groove 2313 and the valve element 217 is gradually increased. This makes it possible to facilitate the movement of the viscous fluid 299, thereby reducing the resistance in turning the lower door 41 in the closing direction. The lower door 41 can be closed easily.

As above, the vehicle door opening/closing device of the present embodiment is arranged such that the hinge member 10 includes the first hinge arm 11 fixed to the floor 60, the pin shaft 15 fixed to the first hinge arm 11 and protruding outward of the first hinge arm 11, and the second hinge arm 13 pivotally mounted on the pin shaft 15 and fixed to the lower end of the lower door 41; and the damper 20 includes the rotor 21 connected to the projecting portion 159 of the pin shaft 15, the housing 23 rotatably mounted on the rotor 21 and fixed to the lower door 41, and the braking means 29 contained in the housing 23 and arranged to impart the braking force to the housing 23 when rotated relative to the rotor 21. Since such a hinge member including the pin shaft provided with the projecting portion is used, a simple configuration that the rotor of the damper is connected to the projecting portion can improve an opening and closing feeling of the lower door.

The present invention is not limited to the above embodiment and may be embodied in other specific forms without departing from the essential characteristics thereof.

For instance, the above embodiment shows the case where the damper is connected to one of the hinge members. Alternatively, the damper may be provided for each of the hinge members or only the left one.

Further, the housing of the damper may be fixed to the floor so that the rotor is rotated in synchronization with the door.

In the above explanation, the eccentric groove of the damper is provided in the housing. Alternatively, the shaft of the rotor may be provided with an eccentric groove to control the flow of viscous fluid.

INDUSTRIAL APPLICABILITY

The present invention is a vehicle door opening/closing device including a hinge member for pivotally connecting a door for opening/closing an opening of a vehicle body to the vehicle body, and a damper for imparting a braking force to the door when the door is turned relative to the vehicle body. The hinge member includes a first hinge arm to be attached to one of an edge of the opening and an end of the door facing to each other, a pin shaft fixed to the first hinge arm to be placed along the edge of the opening and the end of the door, and a second hinge arm pivotally mounted on the pin shaft and to be attached to the other of the edge of the opening and the end of the door. The damper includes a rotor connected to the pin shaft, a housing rotatably mounted on the rotor and to be attached to the one of the vehicle body and the door, and a braking means contained in the housing and arranged to impart a braking force to the housing when the housing is rotated relative to the rotor. Accordingly, the damper is disposed on the axis of the pin shaft of the hinge member between the edge of the opening and the edge of the door. Thus, the vehicle door opening/closing device that includes the damper which will not interfere with the work of taking in and out baggage and that provides a good appearance can be achieved.

The invention claimed is:

1. A vehicle door opening/closing device including a hinge member pivotally connecting a door for opening and closing an opening of a vehicle body to the vehicle body, and a damper for imparting a braking force to the door when the door is turned relative to the vehicle body, wherein the hinge member includes:
a first hinge arm arranged to attach to one of an edge of the opening and an end of the door facing to each other;
a pin shaft fixed to the first hinge arm and arranged to be placed along the edge of the opening and the end of the door; and
a second hinge arm pivotally mounted on the pin shaft and arranged to be attached to the other one of the edge of the opening and the end of the door; and the damper includes:
a rotor connected to the pin shaft;
a housing rotatably mounted on the rotor and arranged to be attached to either the other one of the edge of the opening and the end of the door, or the second hinge arm; and
a braking means contained in the housing and arranged to impart a braking force to the housing in a manner that the braking force to be imparted to the door is changed only when the door is opened according to an opening degree of the door when the housing is rotated relative to the rotor;

wherein:
the hinge member is arranged to connect a lower end of the door to the vehicle body in such a way that the door can be turned upward and downward, and the damper has a resistance element to increase the braking force as the door is turned in an opening direction from a vertical closed position; and
the braking force stays in a uniform maximum value while the door is opened in the range of 60° to 90° of a fully-opened position from the vertical closed position.

2. The vehicle door opening/closing device according to claim 1,
wherein one end of the pin shaft forms a projecting portion that extends outward of both hinge arms and is connected to the rotor.

3. The vehicle door opening/closing device according to claim 1, wherein
a flow passage groove is formed on an inner peripheral surface of the housing to change a flow passage area in a peripheral direction.

4. The vehicle door opening/closing device according to claim 1, wherein
the flow passage groove is an eccentric groove.

5. The vehicle door opening/closing device according to claim 1, further comprising:
a valve member having U-shape in section, the value member having a cutout on one side thereof; and
a vane positioned in a space surrounded by the U-shaped valve member, the vane protruding outward of the rotor;
wherein the valve is to close the cutout when the door is opened.

* * * * *